(12) United States Patent
Silverberg

(10) Patent No.: US 8,786,569 B1
(45) Date of Patent: Jul. 22, 2014

(54) INTERMEDIATE CURSOR TOUCHSCREEN PROTOCOLS

(71) Applicant: Morton Silverberg, Westport, CT (US)

(72) Inventor: Morton Silverberg, Westport, CT (US)

(73) Assignee: Morton Silverberg, Lansdowne, Westport, CT (US)

( * ) Notice: Subject to any disclaimer, the term of this patent is extended or adjusted under 35 U.S.C. 154(b) by 0 days.

(21) Appl. No.: 13/910,058

(22) Filed: Jun. 4, 2013

(51) Int. Cl.
*G06F 3/0488* (2013.01)

(52) U.S. Cl.
CPC .... *G06F 3/0488* (2013.01); *G06F 2203/04104* (2013.01); *G06F 2203/04808* (2013.01); *G06F 3/04886* (2013.01)
USPC ........................................................ 345/173

(58) Field of Classification Search
CPC .............. G06F 3/0488; G06F 3/04886; G06F 2203/04104; G06F 2203/04808
USPC ........................................................ 345/173
See application file for complete search history.

(56) References Cited

U.S. PATENT DOCUMENTS

| | | | | |
|---|---|---|---|---|
| 5,825,352 A | * | 10/1998 | Bisset et al. ................... | 345/173 |
| 7,023,428 B2 | * | 4/2006 | Pihlaja .......................... | 345/173 |
| 7,489,306 B2 | * | 2/2009 | Kolmykov-Zotov et al. . | 345/173 |
| 8,009,146 B2 | * | 8/2011 | Pihlaja .......................... | 345/173 |
| 2005/0162402 A1 | * | 7/2005 | Watanachote ................. | 345/173 |
| 2006/0026535 A1 | * | 2/2006 | Hotelling et al. ............. | 715/863 |
| 2007/0273658 A1 | * | 11/2007 | Yli-Nokari et al. ........... | 345/173 |

* cited by examiner

*Primary Examiner* — Ariel Balaoing

(57) ABSTRACT

User protocols that utilize a computers touchscreen as a display sized touchpad for computer control with both an intermediate cursor and direct finger touch computer control capability. One protocol combines: cursor initiation where and when a single finger contacts appropriate touchscreen locations; accurate cursor positioning with directional and distance controlling screen contacting motions; and creating touchpad button down events with a delayed additional finger making momentary or continuing finger screen contacts while a preceding finger is still in contact. Cursor Initiation eliminates searching for the cursor, and enables a deft selection capability comparable to direct touch selection. An alternate protocol emulates current always-available cursor based computer operation. Both protocols enable: precision selection capability vs. significant direct finger contact selection limitations; probing how the image display is organized before selection; and the use of software and operating systems functionally similar to that on cursor based personal computers.

13 Claims, No Drawings

INTERMEDIATE CURSOR TOUCHSCREEN PROTOCOLS

FIELD OF THE INVENTION

The Intermediate Cursor User Protocols consists of critical sets of gestures and the associated computer responses that use the touch-sensitive display of a touchscreen computer as both a display sized touchpad that controls an intermediate cursor and to direct touch control the associated computer. The intermediate cursor control offers advantages over both alternative cursor control means and direct touch control for controlling and utilizing a computer while retaining direct touch computer control capability where valuable or desired.

BACKGROUND OF THE INVENTION

Touchscreens and their related direct touch protocol provide a versatile, space efficient, and intuitive computer user interface that is particularly enabling for mobile, small screen smartphones, and has proven valuable for larger touchscreen tablets. However direct finger touch control limits selection accuracy due to the selecting finger blocking the view of what is being selected, the large finger contact area, and any correlation inaccuracy between the information pixel locations and touch position measurement system. This dictates the use of large selection targets, and ultimately limits the functionality of direct touch controlled operating systems and applications. For smartphones, which target high mobility applications, games, and other consumptive uses, the major limitation is unreliable selection of small selection targets and constraints on how information can be formatted. For larger screen tablets and laptop display sized units, direct touch control significantly limits their utility, capability, and compatibility in addition to limiting their selection reliability.

The Intermediate Cursor Protocols use the touchscreen as a display sized touchpad to control an intermediate cursor that in turn controls the computer processing of information and the operating system. Its precise cursor selection capability provides a solution for direct touch selection limitations. More importantly, it also provides for enhanced system and application capabilities as well as functional compatibility with conventional cursor based computer operation while also providing significant advantages over alternative cursor controlling means.

The protocols define a critical array of gestures and associated computer responses that provide a finger touch vocabulary that can provide the ability to create, position, actuate, and terminate a cursor display that is intermediate between the finger contacts with the touchscreen, and controlling the computer. The gestures are also constrained to be compatible with both the multi-touch capability of the touch-sensitive display and not limit use of critical direct touch gestures.

The cursor and gestures also provide for being able to probe how the image display is organized prior to selection; achieving deft and intuitive selection capability comparable to direct touch; and eliminating the need to search for the cursor's location. Direct touch functionality is retained for virtual keyboards and games requiring immediate computer responses, and selection of application icons, if desired.

SUMMARY OF THE INVENTION

The intermediate cursor protocols use finger contacts with the touch-screen as a full capability touchpad the same size as the display screen to control and utilize an intermediate cursor on the touchscreen, while retaining direct touch capability, and without requiring additional space and hardware. It provides: a solution to the accurate pointing limitations of direct touch; an easy to learn software and systems operation that is functionally similar and equivalent to that on the user's other cursor based computers; and the capability of being able to probe how the image display is organized prior to selection. One protocol initiates formation of a cursor and thus provides deft and intuitive selection capability comparable to direct touch; and eliminates the need to search for the cursor's location. An alternate protocol more closely emulates conventional cursor control. Both protocols use the intermediate cursor capability to enable operating systems and applications that are both compatible with, and have advantages over, current cursor based systems. The following three simplified gestures descriptions define the core of the cursor initiating protocol.

The Initiation Gesture uses a single finger contact with the touch-screen to initiate a cursor display when and where the finger contacts the screen except on portions of the display or items reserved for direct touch control, or when the cursor is not yet terminated. This gesture provides for an intuitive way to position the cursor close to it's desired position, eliminates the need to search for the initial cursor position, and provides the basis for later defined intuitive and deft user selection of suitably large selection targets comparable to direct touch.

The Positioning Gesture accurately positions the previously initiated cursor with generally a short single finger directional and distance-controlling touch-screen swiping contact where a finger moves while in contact with the touch sensitive screen. This swiping contact uses a user chosen screen-contacting location that does not block the user's view of the desired final cursor position. Preferably the existence of an initiated cursor optionally serves to retract large virtual keyboards and inhibits computer response to finger contact with direct touch elements during this phase and thus maximizes the view of information on the display and space for positioning screen-contacting motions. Alternatively the user can avoid direct touch areas or items.

The Selecting Gesture uses delayed momentary or prolonged touchscreen contacts by an additional finger on the same or another hand while a preceding finger that was used to initiate or position the cursor is still in contact with the screen. Contacts of the additional finger with the screen create the equivalent of touchpad button down events. When combined in one hand motion with the Initiation Gesture, it provides for a deft one-handed selection action comparable to direct touch selection.

A non-gesture related aspect of the cursor initiation protocol is that the cursor display is terminated if single finger screen contact is not maintained or does not occur within a user determined time delay following cursor Initiation, Positioning, or Selection. An additional option is to have the cursor display terminated if and when both fingers are lifted from contact after a Selection Gesture.

The alternative protocol provides for a cursor to always be available in a screen area intended for cursor control. This has the virtue of closely emulating conventional touchpad cursor protocol. Single finger directional and distance controlling touchscreen swiping contact(s) in other than areas, or contacting items reserved for direct control, position the cursor as in the preceding Positioning Gesture. Delayed second finger contacts, as in the Selection Gesture, create the equivalent of touchpad button down events. This provides virtually all the advantages of the cursor initiating protocol, but not a deft one-handed simple selection capability, or eliminate having to search for the initial cursor position.

Combinations, extensions, and variations of the preceding novel gestures and associated information processing establish a gesture vocabulary that duplicates, and improves on, all multi-touch touchpad gestures and associated functionality. This enables: the user to easily learn and use these gesture combinations; intuitive, deft, improved selection reliability for small-screened smartphones and tablets; use of laptop equivalent software and operating systems for tablet and larger touch-screen based computers; and importantly, retaining the advantages of direct touch controlled operation where significant.

DETAILED DESCRIPTION

Touch-screen based computers consist of computer assemblies combining a capable internal computer, and a versatile, intuitive, touch sensitive digital display screen. They commonly also have access to cloud based storage and computing support, wireless connectivity, and increasingly capable voice recognition. The digital display and the computers ability to monitor the positions and motions of a finger touches on the touch-screen are coordinated such that finger contact locations can be correlated by the computer with the information displayed at those locations. This provides the basis for using direct finger contacts, and their motions while in contact with the screen, to control touchscreen based smartphone and tablet computers operation and information processing. The combination provides for compact, versatile, intuitive to use, capable, mobile computing capability.

Currently these computers are designed for operation with the direct touch of a finger, without the use of a cursor, or with external cursor controlling means. However direct finger contact with the touchscreen blocks the user's view of the information being selected, and the finger contact area is relatively large, and therefore imprecise. Additionally there can be correlation inaccuracies between the information pixel locations and touch position measurement system. These accurate pointing constraints limit the functionality and organization of the operating system, its applications, and the reliable selection of screen information for processing.

Laptop and tabletop computers utilize cursor displays to provide precision pointing capability that avoids these constraints and provide a versatile communication capability, but require additional external pointing devices and working space; require searching for, and then navigating from, the current cursor location; don't provide for space saving virtual keyboards; and are less intuitive to use than direct touch control.

The Intermediate Cursor Touchscreen Protocols utilize the touch-screen as a multi-touch, full capability touchpad the same size as the display screen. Both protocols provide precise selection and all the other valuable cursor attributes and capabilities, and the cursor initiating protocol uniquely eliminates the need to search for the initial cursor location; plus intuitive, deft selection capability that is comparable to direct touch. The protocols also provide for functional compatibility between touchscreen and conventional computers with an external cursor controller for either or both the operating system and applications; while also maintaining direct touch control capability for virtual keyboards, control keys, and games, where instantaneous or special responses are needed as well as where desired.

The following descriptions of gestures and their associated computer responses define the preferred set of gestures, variations, constraints on gestures useable under direct touch protocols, and associated computer processing that comprises the Intermediate Cursor Touchscreen Protocols.

The Initiation Gesture utilizes one of the unique attributes of a touchpad coordinated with, accurately superimposed on, and the size of, the display. The user points to, and touches, a desired item or location on the touchscreen information display with a single finger and a cursor display is initiated where and when the single finger contacts the touch-screen, and then is moved to wherever the finger moves before separating from screen contact. The initial contact forms a cursor that moves with the moving finger contact location and can act to probe the information organization and contents as are common in cursor systems. There are two constraints on the computer response to this gesture. One is that a single finger can no longer be used for scrolling. Instead dual simultaneous fingers are used for scrolling, as in touchpad systems, for any operating system or application utilizing these cursor protocols. Otherwise a short post initial contact motion while in screen contact would result in scrolling rather than re-positioning. The second is that the touch can't be on an item or in an area identified and reserved for direct contact by a finger. The initiation gesture eliminates the need to locate the unknown position of the cursor and then navigate from there to where it is desired, generally requires only a short positioning action, and provides the basis for deft one-handed user selection of suitably large selection targets to be subsequently described.

The Positioning Gesture serves to accurately position cursors after the finger used to initiate the cursor has separated from the touch-screen surface. The finger used to initiate the cursor, or another finger, makes single or multiple directional and distance-controlling motions in contact with the touch sensitive screen anywhere but on areas reserved for direct contact. As previously noted, dual simultaneous fingers must be used for scrolling, rather than a single finger, for any operating system or application utilizing these cursor protocols, as with a touchpad. The screen-contacting cursor positioning motions are subsequently referred to as swipes, and the cursor displacement motion can be a function of both the finger displacement distance and velocity. The positioning contact location is essentially anywhere the finger doesn't block the view of the cursor and end-positioning target. The existence of an initiated cursor preferably inhibits the computer response to finger contact with areas reserved for direct touch control, and causes the temporary retraction of screen information blocking virtual keyboards. Alternatively the user can avoid such areas, and/or initiate retraction of the virtual keyboard.

The Selection Gesture combines single or multiple momentary or prolonged, screen contacts by an additional finger on the same or another hand, after and while a preexisting contact by a finger used to initiate a cursor display, or to position the cursor, remains in screen contact. Each brief or extended screen contact by the additional finger serves as the equivalent of a touchpad button down event, and can provide for all functional uses of a touchpad button in combination with positioning the cursor. The Selection Gesture can be combined with the Initiation Gesture for deft one-handed selection of suitably large area selection targets that is fully comparable to, and can replace, direct touch selection. The combination involves pointing to, and touching, a desired selection target with a finger, thus initiating a cursor. A briefly contacting additional finger shortly afterward selects the item. The recommended fingers for the preceding actions are the middle and index fingers in either or alternating order, but any, and alternating, finger combinations can be used.

When selection targets are judged to be too small or less clearly defined, a cursor can be first initiated with a single finger touch that approximates the desired location. The finger is then lifted from contact and it or another finger contacts the screen surface in a location where the finger doesn't block the view of the cursor and the location of the desired selection target. One or more swiping motions are then used to accurately position the cursor. A momentary screen contact by an additional finger while the positioning finger is still in contact completes the selection. Lifting either finger allows the remaining contacting finger to move while maintaining contact to reposition the cursor and provide for another selection with a delayed additional finger, etc. Alternatively both fingers can be lifted from contact and one brought back to position the cursor with one or more swiping motions if contact or successive contacts are made in less than the later described user chosen time delay for cursor termination. Either process is useful for pull-down menus and selection from contextual and editing choice window displays generated after screen information has been selected for processing.

One non-gesture aspect of this protocol is how the cursor display is terminated so that a new one can be positioned where desired. The cursor display is terminated if single finger screen contact is not maintained or does not occur within user determined time delays on the order of about 2-10 seconds following cursor Initiation, Positioning, or Selection. The time delay needs to be long enough to allow for normal sequential use of the same cursor, but short enough to not interfere with when initiating a new cursor position is desirable. Cursor Termination also has to deal with an accidentally initiated cursor or where the user has changed their mind. An additional option is to have the cursor display terminated if and when both fingers are lifted from contact after a Selection Gesture. Retaining one finger in contact allows for that finger to move while in screen contact to reposition the cursor.

Selection of a text string or dragging a selected item to a new location under Intermediate Cursor Touchscreen Protocols differs in detail vs. normal touchpad use. The sequence starts with positioning the cursor at the beginning of the text string or selected item. The additional finger then makes screen contact, equivalent to a button down on a touchpad. However both fingers then move while in screen contact to define the end of the text string, or desired new position for the selected item. This differs from touchpad use, which generally involves multiple swiping motions while keeping the button depressed. The use of two moving fingers in contact screen created by a sequential two-finger contact with the screen prior to motion of the two fingers has to be differentiated by the computer from simultaneous contacting dual fingers so to not cause a scrolling action. Removing one or both fingers from screen contact completes the selection. If only one finger is raised the other can be used to reposition the cursor. If both are raised the cursor is retained for a few seconds to allow for further positioning and selections as previously noted. If either of the fingers or the cursor approaches a window boundary, the information display must automatically scroll in the proper direction to access the hidden information.

As in the preceding, Intermediate Cursor Touchscreen Protocols can provide an array of alternate information editing capabilities fully equivalent to conventional cursor controlled computer systems, but sometimes with differences in the details.

One example involves alternatives for accessing contextual or editing choice menus without a right click button or Control key. One solution for initiating such menus utilizes the Selection Gesture when both fingers maintain stationary screen contact for a user-determined period of time on the order of 1-2 seconds. Lifting one finger, or operating within the cursor termination delay, allows re-positioning the cursor and selecting one of the menu options. The menu choice can lead to other choices. Another involves presenting a limited menu of editing choices with options for more extensive menus whenever an item is selected and further processing is required.

Other solutions include having the virtual alphameric and punctuation keyboard include the information editing control keys normally present in external keyboards and/or providing a horizontal array of individual virtual information editing keys along the bottom of the touchscreen display whenever items are selected for processing. The editing options to be provided include the Control Key for access to contextual and editing choice windows, and the Cut, Copy, Insert, Undo, and Delete functions. The utilization of the Control virtual key also differs from current practice by being sequential, rather than simultaneous, and briefly touched just prior to the Selection Gesture rather than preceding and during it. This timing difference facilitates one-handed operation, use of smaller virtual keys, and using the cursor for selection as described in the following information. Alphameric keyboard combinations such as the Cut, Copy, Insert, Undo, and other functions would involve a brief touch of the Delete key or the serial touch of the Command key and the respective X, C, V, Z, etc. keys following the Selection Gesture. Use of the horizontal array of individual virtual editing keys would be similar but without requiring Command key involvement.

The preceding has dealt with the new gestures and changes to current touch-screen computer protocols. It has not discussed in detail the way in which the Intermediate Cursor Touchscreen Protocols benefit from aspects of cursor based computer protocols that are not available to direct touch computer control. Cursor usage normally provide for displaying how the display information is organized for selection. These information groupings are revealed by such as background changes, underlining, changes in the type of cursor display, and opening a window of additional information. These responses provide information as to what is available for selection. They also provide for optionally refining the initial contact with the cursor-initiating finger and searching for these responses to determine the proper position to complete the selection gesture. Cursors also enable operating systems and applications to use branching windows of editing alternatives that require the accuracy and reliability of cursor selection.

The always-present Intermediate Cursor Touchscreen Protocol starts out with a cursor in a screen display area that is not reserved for direct touch control rather than initiating a cursor with a single finger screen touch. This has the advantage of more closely emulating normal touchpad cursor protocol with the difference of using the Selection Gesture's delayed additional finger single, multiple, or extended contacts while a preceding finger remains in contact to create the equivalent of touchpad button down events. The always-present cursor avoids the various cursor management details of the initiated cursor protocol, but does not provide for deft one-handed simple selection capability, or eliminate the need for locating the initial cursor location. However it does provide for precise cursor positioning and compatibility with cursor based operating systems and applications.

This always-present cursor protocol shares in the various constraints and detail differences noted previously. In particular scrolling requires dual simultaneous fingers and that single finger motions in screen contact are only for cursor positioning. It also requires distinguishing between delayed two finger and simultaneous dual finger motions in screen contact to avoid unintended scrolling.

The intermediate cursor protocols can also interact with direct touch controlled areas and items. Positioning a cursor on or over an item designated for direct touch control and executing a selection gesture with an additional contacting finger results in the equivalent of a direct touch response. This capability can be valuable for small, and large, touchscreens under difficult viewing conditions, where the pointing finger also blocks illumination of the selected item; or for individuals with poorer eyesight or finger dexterity. The cursor presence can provide enlarged icons or textual descriptions prior to selection. For the ever-present cursor protocol a series of selections, such as with an alphameric keyboard, would involve successive cursor positions with single finger swiping motions in a user chosen area of the display, and additional finger touches to select the keys. The magnification of the cursor motion vs. the swiping motion determines the required size of the swiping area.

Either protocol can be used to select apps or even keys in a virtual keyboard with the initiated cursor protocol first requiring the creation of a cursor in a window area not reserved for direct touch control. Then the cursor can be positioned over an item reserved for direct touch control with one or more single finger swiping motions and an additional brief finger contact serving as a direct contact.

Thus two method based solutions for controlling and utilizing a cursor on a computer coupled to, and controlled by, a touch-sensitive display (also referred to as a touchscreen) have been described. The methods can be used alone or in combination with touchscreen-based methodology that uses direct finger contacts with graphic user interfaces to control the computer's operation. Both of the two methods control a cursor display that is intermediate between finger contacts on the touchscreen and actual control of the computer's operation; and use a novel set of one and two-fingered touchscreen contacting gestural combinations as a communications protocol to control and utilize the cursor to direct and control the computer's operation. A significant subset of the two finger gestures resembles how finger motions are used with a touchpad and button in touchpad-controlled computers; facilitating user learning, and programming applications use of the methodology. The preferred method combines the ability to create and position a cursor with the touch of a single finger under special circumstances; positioning the cursor with directional single finger motions in contact with the touchscreen surface; a variety of novel sequential two finger touchscreen contacting actions to manipulate and utilize the cursor to control the computer; and various mean of terminating the cursor to provide for creating another cursor when and where it is desired. One unique and valuable attribute of its cursor creation and termination capabilities is a two finger gesture that can select a GUI and terminate the cursor in one quick deft hand motion that equals that of direct touch selection without sacrificing the options and advantages of cursor use. The other cursor-based method does not include cursor creation and termination, and is more limited. However it's advantages include, as in the first method, precise and reliable selection capability, compatibility with current cursor based software operation, use of the cursor to probe the organization of the data displayed on the touchscreen, and elimination of the need for the space, volume and cost of a touchpad.

What is claimed is:

1. In a computer coupled to, and controlled by, a touch-sensitive display, a method utilizing a novel set of one or two fingered touchscreen contacting gestures that provides a communications protocol for control of the creation, positioning, utilization and termination of a cursor display that is intermediate between said finger contacts and control of the computer's operation, the method comprising:

creation and positioning of a cursor display at a proximate location of a single finger's area of contact with the touch-sensitive display with the contact of said finger on said touch-sensitive display, except when a cursor already exists on said touch sensitive display, or said finger contact is on a predefined region, item or GUI's reserved for, and capable of, directly initiating computer processing actions when contacted by a single finger; and cursor positioning after a cursor is created that comprises: one or more single finger directions of motion and distance of travel while in contact with said touch-sensitive display that control a direction and distance of travel of said cursor to position the cursor to identify a desired item or location on said touch-sensitive display; and after the cursor is positioned, the two finger touchscreen contacting gestures that determine pre-designated processing actions with respect to the said cursor identified locations or items comprise:

maintenance of the contact between said touchscreen and a single finger that initiated, positioned or is now controlling the position of a cursor at a desired location or item while an additional single finger of the same or another hand makes one or more rapid momentary contacts or an extended duration contact with said touch-sensitive display at a predefined or user controllable minimum frequency or contact time duration with said touch-sensitive display; wherein the number of rapid momentary contacts and/or an extended duration contact by said additional finger with the touch sensitive display serve as signals to the computer for predefined processing actions at the locations, or information and items, identified with said cursor.

2. The method of claim 1, where terminating a cursor comprises:

lifting of the cursor initiating or positioning finger from touchscreen contact at essentially the same time as the additional finger is removed from it's last contact with said touchscreen surface serving as a signal to terminate the cursor display.

3. The method of claim 1, where terminating a cursor comprises:

a single finger not making contact with the touchscreen within a predetermined or user controllable time period following each ending of single finger contact with the touchscreen surface.

4. The method of claim 1, where terminating a cursor comprises:

the use of two or more brief single finger contacts with said touch sensitive display when a cursor display is present on said touch sensitive display and the contact is not in a location responsive to direct single finger contacts.

5. The method of claim 1, where a cursor can be used in place of a direct touching single finger to actuate a designated direct touch item, area or GUI, comprising first positioning said cursor over the said direct touch item or area and said single finger positioning the cursor remaining in contact with the touchscreen surface; and an additional single finger making one or more momentary, or an extended contact with the touch sensitive display; resulting in a computer responses equivalent to a said single finger making momentary contacts or an extended contact with said designated direct touch item or area.

6. The method of claim 1, where vertical or horizontal repositioning of the information on the touchscreen display comprises:
- two near simultaneously contacting fingers moving a controlled distance in the desired vertical or horizontal direction of window movement while the two fingers remain in contact with the said touch-sensitive surface of the touchscreen display.

7. The method of claim 1, where when a cursor is displayed on the touch sensitive display the responses to the contact of a single finger with predefined regions or items identified and reserved for, and capable of, directly initiating prescribed computer processing comprises:
- blockage of the response except for single finger contact with the virtual keys of an alphameric keyboard and included and/or individual editing or control keys.

8. The method of claim 1 where a "Drag Select" capability to select a string of text or the information in a rectangular selection area comprises:
- a single finger positioning a cursor with one or more directional and distance controlling touchscreen contacting motions so to identify a selection starting point; wherein said positioning finger remains in contact with said touchscreen until an additional finger establishes and maintains contact with the touchscreen surface;
- and wherein said cursor positioning finger is then used to make one or more directional and distance controlling touchscreen contacting motions to reposition the cursor at an ending cursor position determined by lifting both the positioning and the additional finger from touchscreen contact.

9. The method of claim 1 where a "Drop and Drag" capability to reposition a previously selected object comprises:
- a single finger making one or more directional and distance controlling touchscreen contacting motions to position a cursor on a previously selected object and remaining in contact with touchscreen surface until an additional finger establishes and maintains contact with the touchscreen surface and then said positioning finger makes single or multiple directional and distance controlling motions while in touchscreen contact to reposition the selected information from its initial position to an ending position determined by lifting both fingers from touchscreen contact.

10. The method of claim 1 where the generation and display of a "Contextual" menu of editing and/or processing options for a preselected item comprises:
- positioning a cursor over an item that was previously selected with one or more directional and distance controlling single finger touchscreen contacting motions or a single finger cursor creating contact if the cursor has been terminated; and
- wherein the cursor creating or positioning finger remaining in contact with the touchscreen surface while a second finger makes a predetermined, or user controllable, extended time of contact with the touchscreen.

11. In a computer coupled to, and controlled by, a touch-sensitive display, a method utilizing a novel set of one or two fingered touchscreen contacting gestures that provides a communications protocol for control of the creation, positioning, utilization and termination of a cursor display that is intermediate between said finger contacts and control of the computer's operation, the method comprising:
- a single cursor always available in an area of the touchscreen display not reserved for direct touch control, wherein
- said cursor can be moved and repositioned on the display with single or multiple directional and distance controlling single finger screen contacting motions so to position the cursor to identify an item or location on the display; wherein
- after the cursor is positioned, the two finger touchscreen contacting gestures that determine pre-designated processing actions with respect to the said identified locations or items comprise maintaining contact between said touch-sensitive display and said single finger that initiated or positioned a cursor at a desired location or item while an additional single finger of the same or another hand makes one or more rapid momentary contacts or an extended duration contact with said touch-sensitive display at a predefined or user controllable minimum frequency or duration touch-sensitive display contact time; wherein
- the number of rapid momentary contacts and/or a extended duration contact by said additional finger with the touch sensitive display serve as signals to the computer for predefined processing actions at the locations, or information and items, identified with said cursor.

12. The method of claim 11 where vertical or horizontal scrolling of the display comprises:
- two near simultaneously contacting fingers moving in contact with said touch-sensitive display.

13. The method of claim 11 where the cursor can be used in place of a direct touching finger to actuate a designated direct touch item by positioning said cursor over the said direct touch item and having one or more additional brief rapid finger contacts with the touch sensitive display serve as the equivalent of direct finger contacts.

* * * * *